US012281001B2

(12) United States Patent
Pugliese et al.

(10) Patent No.: US 12,281,001 B2
(45) Date of Patent: Apr. 22, 2025

(54) BEVERAGE MIXING DEVICE, BEVERAGE PREPARATION DEVICE AND METHOD FOR PREPARING A BEVERAGE PRODUCT

(71) Applicant: SOCIETE DES PRODUITS NESTLE S.A., Vevey (CH)

(72) Inventors: Alexandre Pugliese, Paudex (CH); Alexandre Perentes, Sullens (CH); Antonin Lizon, Morges (CH); Thomas Gabella, Lausanne (CH); Nicolas Ganshof Van Der Meersch, Vufflens-le-Chateau (CH)

(73) Assignee: Société des Produits Nestlé S.A., Vevey (CH)

( * ) Notice: Subject to any disclaimer, the term of this patent is extended or adjusted under 35 U.S.C. 154(b) by 410 days.

(21) Appl. No.: 17/906,495

(22) PCT Filed: Mar. 29, 2021

(86) PCT No.: PCT/EP2021/058123

§ 371 (c)(1),
(2) Date: Sep. 16, 2022

(87) PCT Pub. No.: WO2021/198162

PCT Pub. Date: Oct. 7, 2021

(65) Prior Publication Data

US 2023/0146755 A1 May 11, 2023

(30) Foreign Application Priority Data

Mar. 30, 2020 (EP) .................................... 20166737

(51) Int. Cl.

| | |
|---|---|
| ***B67D 1/00*** | (2006.01) |
| ***B67D 1/08*** | (2006.01) |
| *B67D 1/07* | (2006.01) |

(52) U.S. Cl.
CPC ........... *B67D 1/005* (2013.01); *B67D 1/0081* (2013.01); *B67D 1/0895* (2013.01); *B67D 1/07* (2013.01);
(Continued)

(58) Field of Classification Search
CPC .... B67D 1/005; B67D 1/0081; B67D 1/0895; B67D 1/07; B67D 2001/075;
(Continued)

(56) References Cited

U.S. PATENT DOCUMENTS 4,938,421 A * 7/1990 Berfield .............. A47L 11/4083 239/323
5,915,592 A * 6/1999 Mehus ..................... B67D 7/74 222/630

(Continued)

FOREIGN PATENT DOCUMENTS

FR 2562053 A1 * 10/1985
FR 2721591 12/1995
WO 0037354 6/2000

*Primary Examiner* — Bob Zadeh
(74) *Attorney, Agent, or Firm* — Thorpe North & Western, LLP

(57) ABSTRACT

The present invention is directed to a beverage mixing device (2) comprising a mixing body (3) defining a mixing chamber (30), at least one or a plurality of fluid inlets (4, 5, 6) for supplying a fluid (L, W, A, S) into the mixing chamber (30), a discharge opening (7) to discharge a liquid (P) from the mixing chamber (30), a sealing element (8) being moveably provided between a closed position for closing the discharge opening (7) and an open position for releasing the discharge opening (7) to allow a liquid (P) in the mixing chamber (30) be discharged via the discharge opening (7), and an evacuation outlet (9) for evacuating the mixing chamber (30) by a fluid (G) be introduced into the mixing chamber (30) via the at least one or the plurality of fluid inlets (4, 5, 6) when the discharge opening (7) is closed by
(Continued)

Figure 1A:
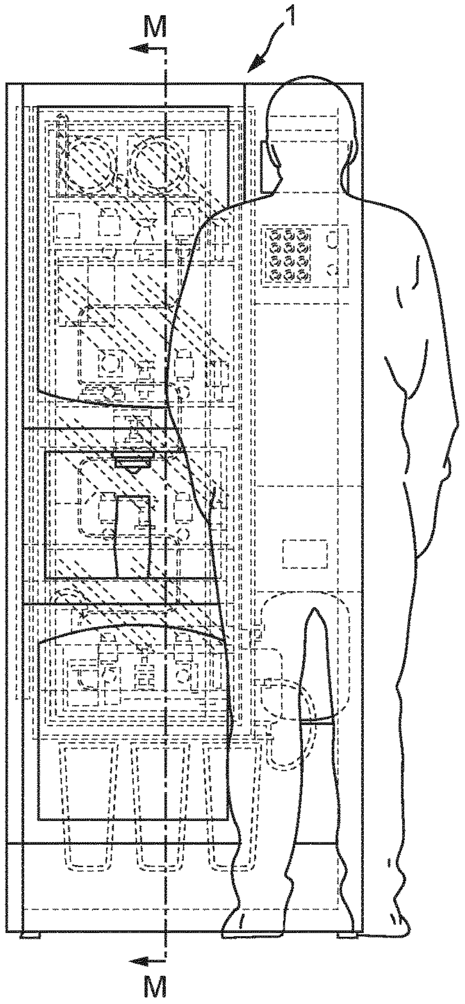

the sealing element (8). The present invention is further directed to a beverage preparation device (1) comprising the beverage mixing device (2), a liquid supply (20), at least one or a plurality of product supplies (40), a gas supply (50), and a drainage (60). Also, the present invention is directed to a method for preparing a beverage product using the beverage preparation device according to the invention.

22 Claims, 8 Drawing Sheets

(52) U.S. Cl.
CPC .................. *B67D 2001/075* (2013.01); *B67D 2210/00026* (2013.01)

(58) Field of Classification Search
CPC ........ B67D 2210/00026; B67D 1/0044; B67D 1/0046; B67D 1/0051; B67D 1/0043
See application file for complete search history.

(56) References Cited

U.S. PATENT DOCUMENTS

| | | | | | |
|---|---|---|---|---|---|
| 2006/0186137 | A1* | 8/2006 | Till | B67D 1/07 | 222/148 |
| 2012/0037662 | A1* | 2/2012 | Romanyszyn | B67D 1/0044 | 222/145.5 |
| 2013/0104743 | A1* | 5/2013 | Deo | B08B 9/08 | 137/15.01 |
| 2017/0168291 | A1* | 6/2017 | Buss | G02B 27/0006 | |
| 2023/0146755 | A1* | 5/2023 | Pugliese | B67D 1/0895 | 222/129.1 |

* cited by examiner

A-A

BEVERAGE MIXING DEVICE, BEVERAGE PREPARATION DEVICE AND METHOD FOR PREPARING A BEVERAGE PRODUCT

CROSS REFERENCE TO RELATED APPLICATIONS

The present application is a National Stage of International Application No. PCT/EP2021/058123, filed on Mar. 29, 2021, which claims priority to European Patent Application No. 20166737.5, filed on Mar. 30, 2020, the entire contents of which are being incorporated herein by reference.

1. FIELD OF THE INVENTION

The present invention is directed to a beverage mixing device including a mixing chamber, a beverage preparation device comprising the beverage mixing device and corresponding fluid supply features for preparing a beverage, and a method for preparing a beverage product using the beverage preparation device.

2. TECHNICAL BACKGROUND

Beverage preparation devices or machines including mixing chambers are well known in the prior art. These beverage mixing devices are often used as beverage preparation means inside vending machines or as soda dispensers. From high end-restaurants to crowded bars to small town diners, serving (ice-cold) beverages is made simple with soda dispensers. The mixing chamber allows mixing water or carbonized water with any additives, like flavours, caffeine, minerals, etc. A major issue of such beverage preparation devices is keeping up a desired or required hygienic and food safety level. Other like hot temperature beverages (e.g. by hot coffee brewing or hot espresso-style coffee extraction), particularly cold beverages do not contribute to keep the overall fluidic safe and sanitized. Also, during non-use, even mixing chambers for hot temperature beverages are prone to unwanted contamination, e.g. bacterial or viral contamination or microbiological growth.

In order to keep the known beverage preparation devices safe, a defined maintenance plan must be strictly applied on a regular (e.g. daily) basis, which requires some efforts and thus increased costs.

A beverage mixing device with a mixing chamber is a specific part of the beverage preparation device's fluidics which usually requires trained people to be properly cleaned without or sufficiently reduced bacterial or viral contamination. This operation requires a cleaning procedure using chemical products, which are often complex and risky to handle.

Beverage mixing devices have another hygienic challenge, which is the risk of allergen cross-contamination. Actually, while several products, e.g. flavours, caffeine, minerals, etc., are fluidly connected to deliver the respective product to the mixing chamber for preparing a corresponding beverage, the risk of getting residual traces of a product from a previous beverage preparation process inside the mixing chamber is high. A systematic and efficient rinsing is thus crucial to avoid any residues of a product from a previous beverage production contaminating the selected beverage of a next beverage production.

The known cleaning procedure usually includes a rinsing phase of the mixing chamber often based on hot water rinsing which requires a specific safety protection against injuries due to hot water splashing, e.g. a safety door or closed cabinet around the machine's dispensing area. This kind of safety features are limiting the automation ability and also the duration of such a cleaning protocol and thus impose trained people to take care of it. On the other hand, automatic cleaning is often desired in a vending machine as it is allowing overnight sanitization, which is a great benefit for any beverage dispenser in terms of safety and hygiene.

The prior art also shows expensive single use parts to address the hygienic challenges related to pipes connection and product liquid container. For most of the vending machines, trained people and technicians have to take care of these spare parts replacement in order to ensure customer's safety with no microbiological growth in the product. This kind of intervention is expensive and not sustainable.

3. SUMMARY OF THE INVENTION

It is thus an object of the present invention to provide a beverage mixing device as well as a beverage preparation device and also a method for preparing a beverage product which allow for an easy, safe, efficient, effective and preferably automatic cleaning and sanitization to securely reduce or eliminate bacterial or viral contamination as well as microbiological growth in the product and machine.

This object is achieved by the subject-matter of the independent claims. The dependent claims study further the central idea of the present invention.

According to a first aspect, the present invention is directed to a beverage mixing device comprising a mixing body defining a mixing chamber, at least one or a plurality of fluid inlets for supplying a fluid into the mixing chamber, and a discharge opening to discharge a liquid from the mixing chamber. The discharge opening is preferably positioned at a bottom of the mixing chamber to thus preferably allow for discharging the liquid from the mixing chamber by gravity. The beverage mixing device further comprises a sealing element being moveably provided between a closed position for closing the discharge opening and an open position for releasing the discharge opening to allow a liquid in the mixing chamber be discharged via the discharge opening (preferably by gravity). Further, the beverage mixing device comprises an evacuation outlet for evacuating the mixing chamber by a fluid be introduced into the mixing chamber via the at least one or the plurality of fluid inlets when the discharge opening is closed by the sealing element.

The beverage mixing device thus allows for cleaning and sanitizing the mixing chamber as well as the corresponding fluid inlet(s) safely and without bacterial or viral contamination or the risk of microbiological growth. The beverage mixing device allows for the sanitization be carried out automatically, if desired. Also, the selective sealing of the discharge opening for sanitizing purposes provides an additional protection feature to protect the user against (hot water) splashing during the cleaning/sanitizing procedure without the use of an additional safety feature, like a door or other closing features being provided around the beverage mixing device. The evacuation outlet allows for a secure evacuation of the mixing chamber during the cleaning/sanitization procedure as it is particularly workable during the sealing element being in the closed position.

In the open position, the sealing element preferably seals the evacuation outlet from the mixing chamber. The sealing element thus allows to be functionally positioned in the open position to seal between the evacuation outlet and the mixing chamber. The sealing element is thus preferably configured such that it closes the evacuation outlet when being in the open position and releases the evacuation outlet when being in the closed position. Hence, the evacuation outlet is "activated" only during the cleaning/sanitization process while avoiding beverage product to exit via the evacuation route during beverage preparation, i.e. when the sealing element is in the open position. Moreover, the sealing element can thus function for two purposes, namely closing of the discharge opening during cleaning/sanitization procedure on the one hand and sealing the evacuation outlet during the beverage preparation on the other hand, thus reducing the number of parts required for these two functions. This also simplifies the layout of the beverage mixing device.

The evacuation outlet is preferably provided at a moveable pipe or tube section, preferably a vertically moveable pipe/tube section. The pipe/tube section preferably carries the sealing element to be thus moveable between the open and the closed position. Hence, the evacuation outlet can be positioned by its (vertical) movability to be at a desired position for evacuating the mixing chamber. If the pipe/tube section further carries the sealing element, its movement between the closed and open position is facilitated as the movements of the pipe/tube section and the sealing element are united.

The evacuation outlet is preferably positioned at a bottom of the mixing chamber, preferably at a lower or lowermost end of the pipe/tube section. In a most preferred embodiment, the evacuation outlet is positioned close to the discharge opening, at least in the closed position of the sealing element. As the evacuation outlet is preferably positioned at a low vertical position of the mixing chamber, secure and effective evacuation of the mixing chamber can be ensured. If the evacuation outlet itself is provided at a (vertically) moveable pipe/tube section as described herein above, it can be selectively positioned close to the discharge opening in the closed position of the sealing element, e.g. when being moved downwards to close the discharge opening, and is thus positioned to ensure an effective evacuation of the mixing chamber, while being distanced from the discharge opening and preferably sealed by the sealing element when being in the upper or open position or during beverage preparation to avoid the produced beverage product be discharged via the evacuation outlet.

In a preferred embodiment, the inlet or the plurality of inlets, respectively, may open into the mixing chamber via an inlet opening being tangentially oriented to the mixing chamber so as to create a vortex inside the mixing chamber with a fluid (e.g. sanitizing fluid/liquid, gas, liquid, and/or beverage ingredients) supplied via the respective inlet opening into the mixing chamber. In other words, the inlet(s) and respective inlet opening(s) are oriented such that they allow a fluid supplied via said inlet opening(s) be introduced into the mixing chamber in a direction being tangential to the mixing chamber. This tangential introduction allows creation of a vortex by the supplied fluid inside the mixing chamber. The inlet opening is preferably provided at a top of the mixing chamber, more preferred opposite to the discharge opening, so that a vortex can be effectively obtained and results in a flowage (i.e. vortex) affecting the whole mixing chamber. As the inlet(s) are oriented tangentially, they allow creation of a vortex inside the volume of the mixing chamber (e.g. with velocity) so as to achieve a proper and effective mixing (e.g. of a beverage product during beverage production) and preferably reaching all inlet openings or entries as well as all internal parts (i.e. the inner volume) of the mixing chamber (e.g. during cleaning/sanitization and/or evacuation).

The sum of the cross-sectional area(s) of the fluid inlet(s) is preferably lager than the sum of the cross-sectional area of the evacuation outlet. This shall create a small flow restriction and thus pressurize the mixing chamber to ensure the mixing chamber be completely filled with a sanitizing liquid during its sanitization procedure preferably without any gas (e.g. air) being trapped in the mixing chamber thus increasing the sanitization effectiveness.

The beverage mixing device may further comprise evacuation sections provided at the fluid inlet and/or the discharge opening and/or the evacuation outlet and is preferably designed to receive trapped gas (i.e. air or air bubbles being trapped within the mixing chamber). The evacuation sections are preferably fluidly connected to a release outlet, respectively, for evacuating the trapped gas to an outside of the mixing chamber. The release outlets are preferably connected to at least one of the fluid inlets to allow the trapped gas be evacuated to an outside of the mixing chamber; preferably to or towards a gas supply of a beverage preparation device as further described herein below. The release outlets preferably surround the corresponding fluid inlet, discharge opening, and/or evacuation outlet in order to ensure a proper filling of the mixing chamber without trapping any gas thus increasing the effectiveness of the sanitization procedure.

According to another aspect, the present invention is directed to a beverage preparation device or machine comprising a beverage mixing device according to the present invention, a liquid supply fluidly connected to the at least one or the plurality of fluid inlets, respectively, for selectively delivering a liquid (e.g. water) into the mixing chamber, at least one or a plurality of product supplies fluidly connected to the at least one or the plurality of fluid inlets, respectively, for selectively delivering a beverage ingredient into the mixing chamber, a gas supply fluidly connected to the at least one or the plurality of fluid inlets, respectively, for selectively delivering a gas (e.g. air) into the mixing chamber, and a drainage fluidly connected to the evacuation outlet for draining the mixing chamber.

The liquid supply allows for delivering a liquid (e.g. water or another liquid beverage product base) preferably forming the basis of the beverage product into the mixing chamber to be mixed with other beverage ingredients, if desired. The product supply allows for delivering any additional beverage ingredients (e.g. additives) for the beverage product to be produced into the mixing chamber. A pump, like a peristaltic pump, is preferably provided between the respective product supply and the mixing chamber for delivering the beverage ingredient into the mixing chamber. As the liquid supply as well as the gas supply are fluidly connected to the at least one or the plurality of fluid inlets, namely preferably to all present fluid inlets of the beverage mixing device, the beverage preparation device allows for cleaning, sanitizing and drying—preferably automatically—the mixing chamber as well as all inlets safely and with severely reduced or even without bacterial or viral contamination or the risk of microbiological growth. This also ensures a proper sanitization of the mixing chamber and the overall product fluidic inlets preferably downstream a beverage ingredient source, like a respective container carrying a beverage ingredient, being connected to the product supplies for delivering a corresponding beverage ingredient into the mixing chamber.

The product supply may be provided to receive beverage ingredient containers. These containers can be any type of food safe containers and are preferably bag-in-boxes (BIB), foldable containers like tetra based containers, and the like. The beverage ingredient containers preferably are collapsible containers in order to keep the aseptic characteristic of the beverage ingredient contained in the respective container.

The beverage ingredient according to the present invention can be any type of beverage ingredient, from any type of liquid beverage product base to any type of additives. As non-exhaustive examples, the liquid beverage product base can be water, soda, lemonade, soup, and so on. The term "additive" mainly relates to a liquid component, or to a liquid component comprising small solid particles. However, the liquid/water supply can also be used for dissolving a solid, e.g. powdered, beverage ingredient as an additive provided via the product supply for discharging the so dissolved beverage ingredient. Additive may preferably be understood as designating a liquid in an amount up to 5%, preferably 0.05% to 1%, preferably 0.1% to 0.5% by volume, of the main liquid material in the final beverage product. As non-exhaustive examples, additive can be a flavour or aroma (for example orange, peach, lemon, etc.) like an edible flavouring concentrate, a tea or coffee extract, a fruit juice, a minerals mother solution, etc. The additive can be a mineral liquid concentrate, or a so-called "functional" concentrate or enhancer such as an additive comprising a vitamin, caffeine or another coffee extract. The expression "functional concentrate" refers to a product that has an effect on the consumer, such as a product that is probiotic, prophylactic, etc.

The liquid supply can be further fluidly connected to at least (a downstream) part of the (at least one) product supply or each product supply—preferably downstream a pump (peristaltic pump) for delivering the beverage ingredient from the product supply to the mixing chamber—for delivering a liquid via the at least part of the respective product supply into the mixing chamber. This even allows for a desired portion at a downstream end of a fluid connection of the product supply be included in the cleaning and sanitizing process to thus securely reduce or even eliminate the risk of bacterial or viral contamination or microbiological growth. A selective delivery of the respective fluid (i.e. water) is preferably obtained by corresponding valves be provided within the liquid supply and preferably be controlled to be opened or closed according to the required process step and requested beverage product.

The liquid supply may comprise a water supply for providing water preferably to the mixing chamber as a sanitizing liquid and/or as a liquid beverage product base.

The liquid supply preferably comprises a liquid or water storage and/or a liquid or water connection for connecting an external liquid/water source. By using a liquid storage, the beverage preparation device can be used without the need of an external liquid/water source. Also, a desired type of liquid can be used and stored within the beverage preparation device. On the other hand, an external liquid/water source allows for a large or even endless supply of liquid/water and does not require any internal liquid storage so that the overall dimensions of the beverage production device can be reduced or used more efficiently.

The liquid supply may further comprise a (liquid) heater or a boiler for heating the liquid (e.g. water) to be delivered. Hence, the liquid/water can be used for preparing hot beverages and as a sanitization liquid for sanitizing purposes. The liquid supply can comprise a (liquid) pump for delivering the liquid.

The gas supply may comprise an air supply for providing air preferably to the mixing chamber for evacuation purposes. The gas supply can comprise a (gas or air) pump or a compressor for delivering gas, preferably hot air. Hence, gas/air supply can be facilitated. For heating the gas or air, a separate heater can be provided. Alternatively, the gas supply and the liquid supply may share the same heater. The use of hot gas/air further allows for an easier evacuation and drying of the beverage mixing device.

According to another aspect, the present invention is directed to a method for preparing a beverage product, comprising the steps of:

- Providing a beverage preparation device according to the present invention,
- moving the sealing element into the closed position,
- sanitizing the mixing chamber by circulating a sanitizing fluid via the inlet or the plurality of inlets through the mixing chamber and via the evacuation outlet to the drainage,
- evacuating the mixing chamber by a gas being introduced via the inlet or plurality of inlets through the mixing chamber and via the evacuation outlet to the drainage,
- moving the sealing element into the open position for opening the discharge opening and preferably also for closing the evacuation outlet (i.e. sealing off the evacuation opening from the mixing chamber),
- delivering a liquid and/or beverage ingredients via the inlet or the plurality of inlets into the mixing chamber to prepare a beverage product, and
- dispensing the beverage product out of the discharge outlet.

The described procedure allows for the beverage preparation device and particularly the beverage mixing device be securely cleaned and sanitized before preparing a beverage product. The process can preferably be carried out automatically. The process can preferably be carried out after each production of a beverage product, after a several amount of beverage products be dispensed and/or at defined times, e.g. every x hours and/or at night. Of course, the process can also be carried out on demand.

The sanitizing fluid preferably is hot water, which is more preferred delivered by the liquid/water supply and even further preferred heated by the water heater or boiler. Hence, the sanitizing fluid can be easily provided and delivered without any additional efforts or provision of a separate sanitizing fluid. Also, the sanitizing fluid can be a chemically based sanitization product/liquid which may allow for an even more effective sanitization compared to water as a sanitizing liquid.

The gas for evacuating the mixing chamber is preferably ambient air or hot air at a defined temperature above ambient air and preferably below 65° C. Hence, the evacuation step can be easily provided by simply using gas (e.g. air) as the evacuation fluid. Moreover, in case the air is heated at a defined raised temperature, drying of the mixing chamber can be further facilitated and accelerated.

The sanitizing fluid and/or the gas and/or the liquid and/or the beverage ingredients can be supplied into the mixing chamber via the inlet or the plurality of inlets, preferably the respective inlet opening(s), so as to create a vortex with said supplied sanitizing fluid inside the mixing chamber. The vortex created (e.g. with velocity of the supplied fluid) in the inside (i.e. the inner volume) of the mixing chamber thus allows for a proper and effective cleaning/sanitization of all inlet(s) or inlet opening(s) or entries as well as all internal parts of the mixing chamber usually being in contact with a beverage product to be created or its components.

At least during the step of sanitization the mixing chamber, any remaining gas or air in the mixing chamber is preferably trapped in the evacuation sections provided at the respective fluid inlets and/or discharge opening and/or evacuation outlet. The trapped gas/air is preferably evacuated via the release outlets to an outside of the mixing chamber, preferably the drainage. Hence, trapped gas/air can be securely avoided within the mixing chamber thus further increasing the sanitization effectiveness.

4. BRIEF DESCRIPTION OF DRAWINGS

Further features, details and advantages of the present invention will now be described with reference to the drawings of the enclosed figures.

Figure 1B:
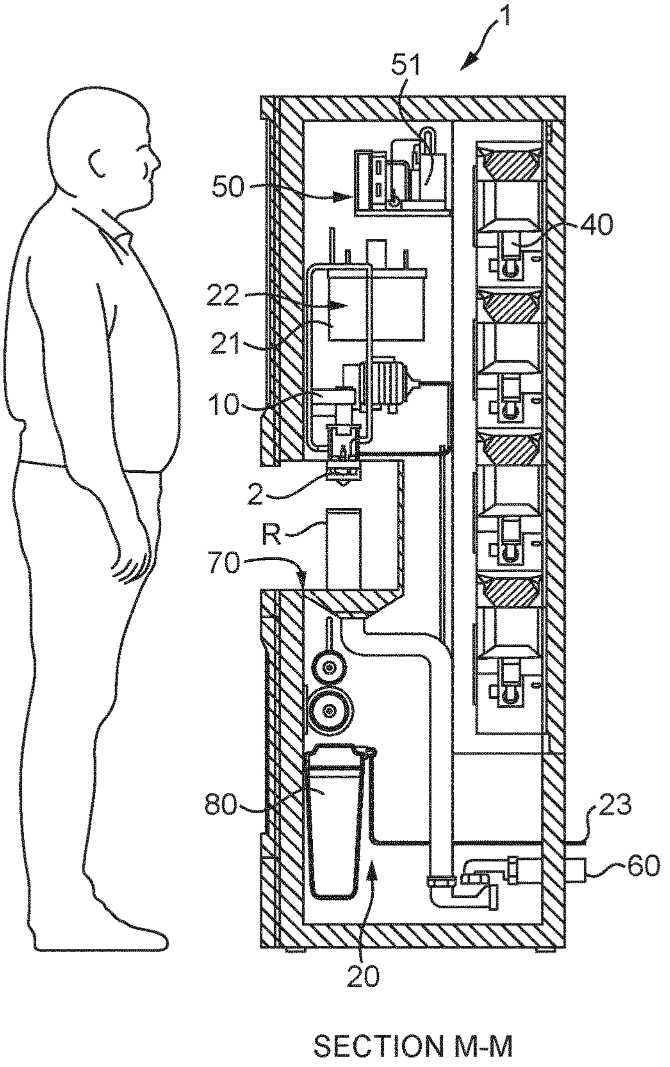
Figure 2A:
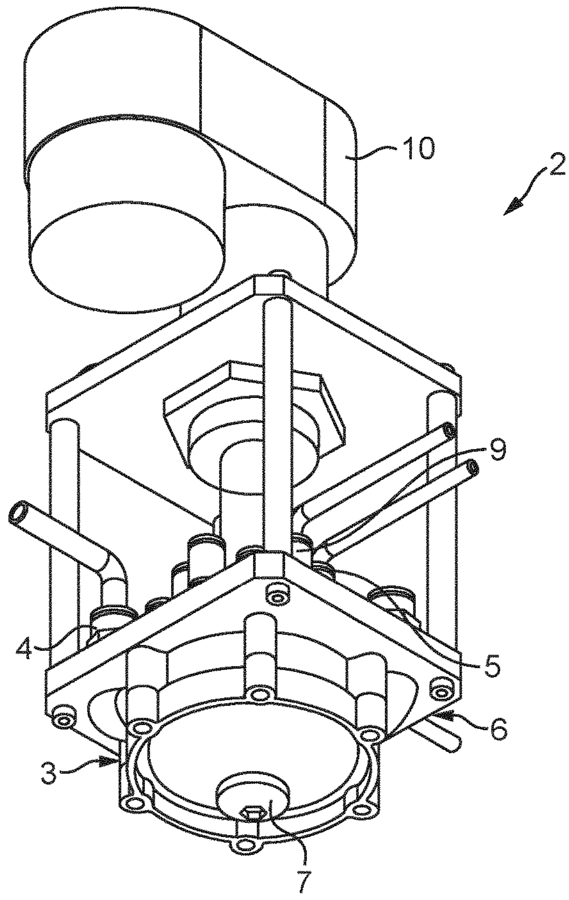
Figure 2B:
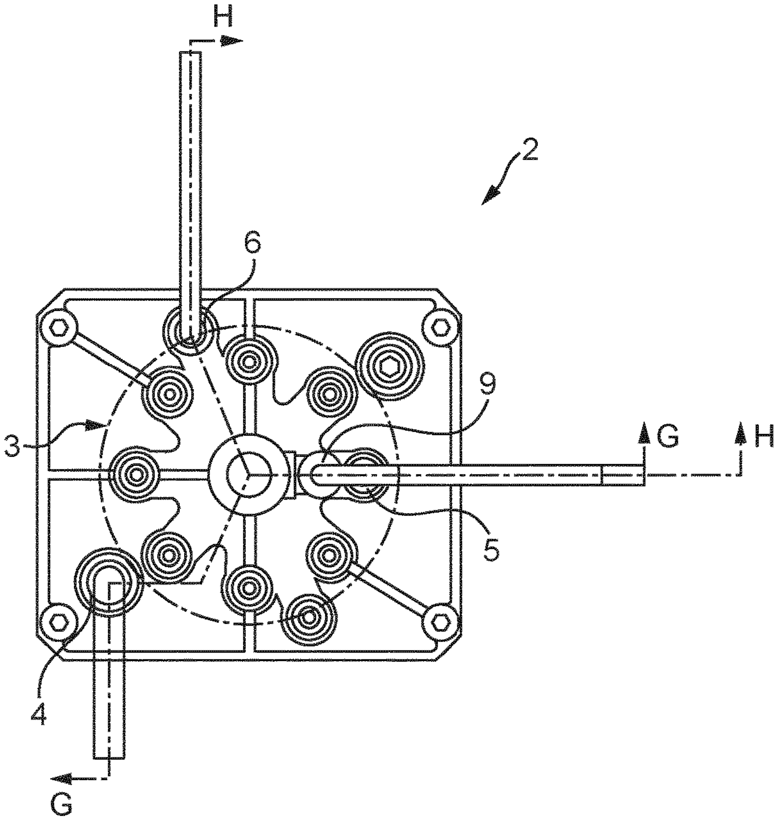
Figure 3:
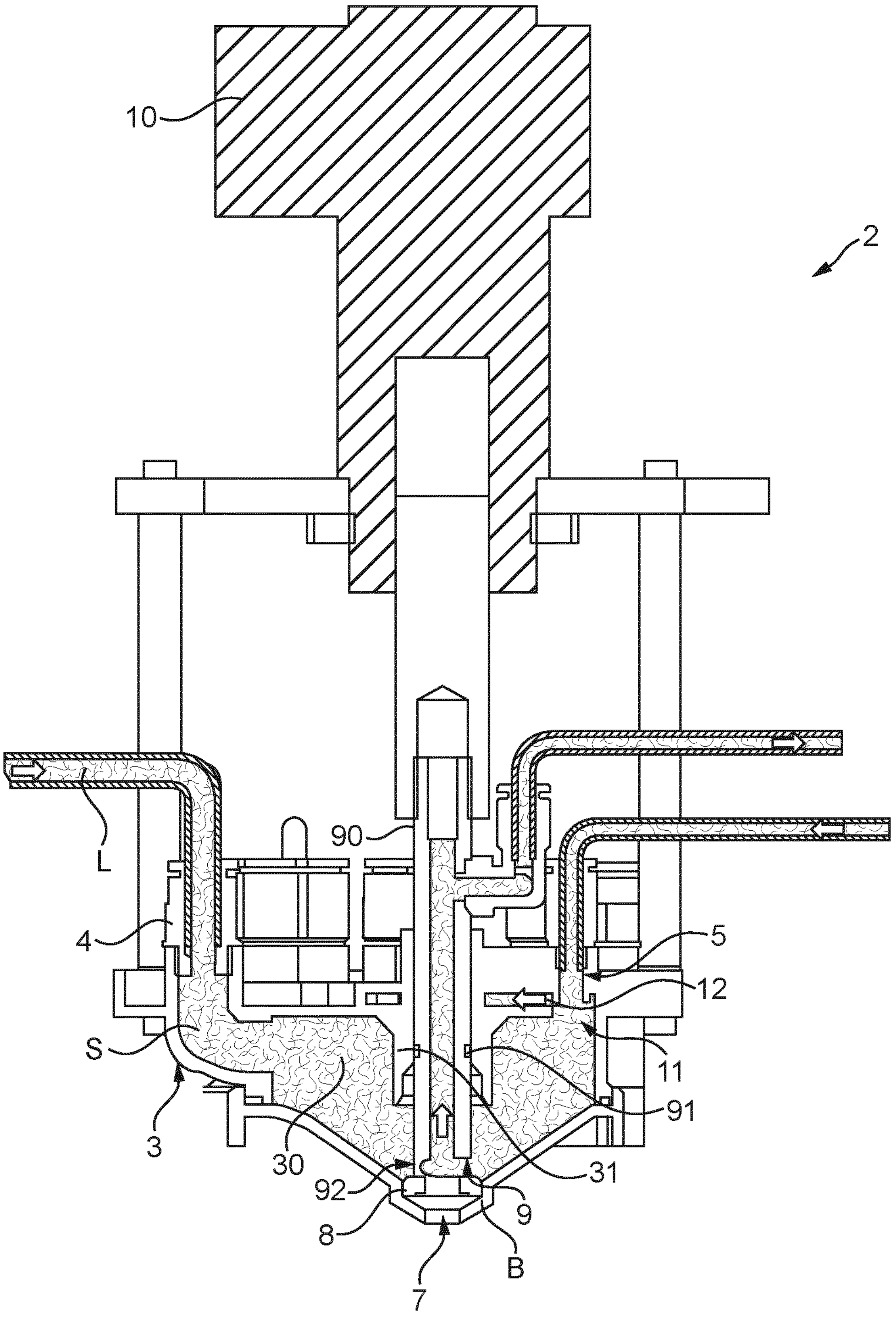
Figure 4:
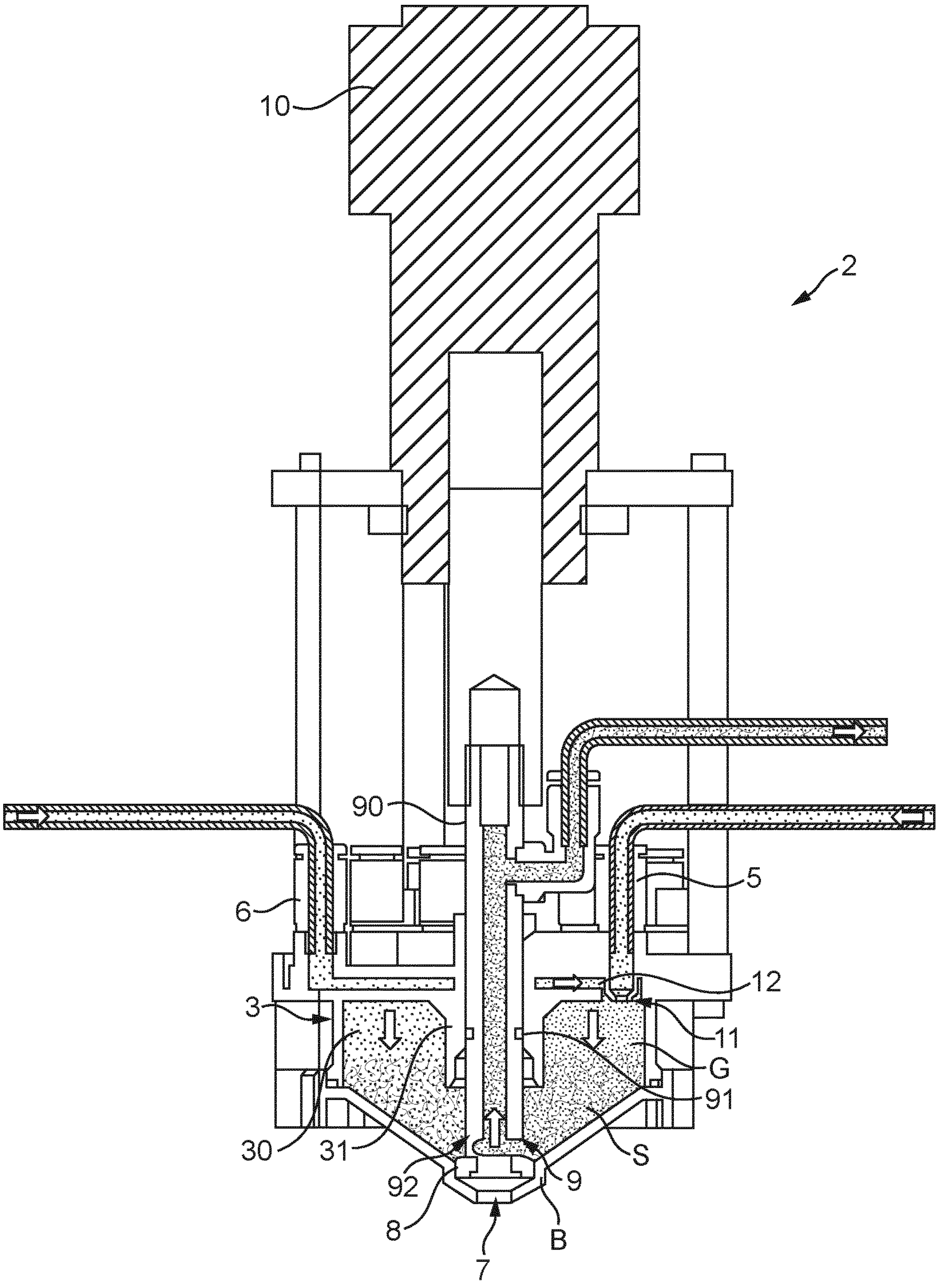
Figure 5:
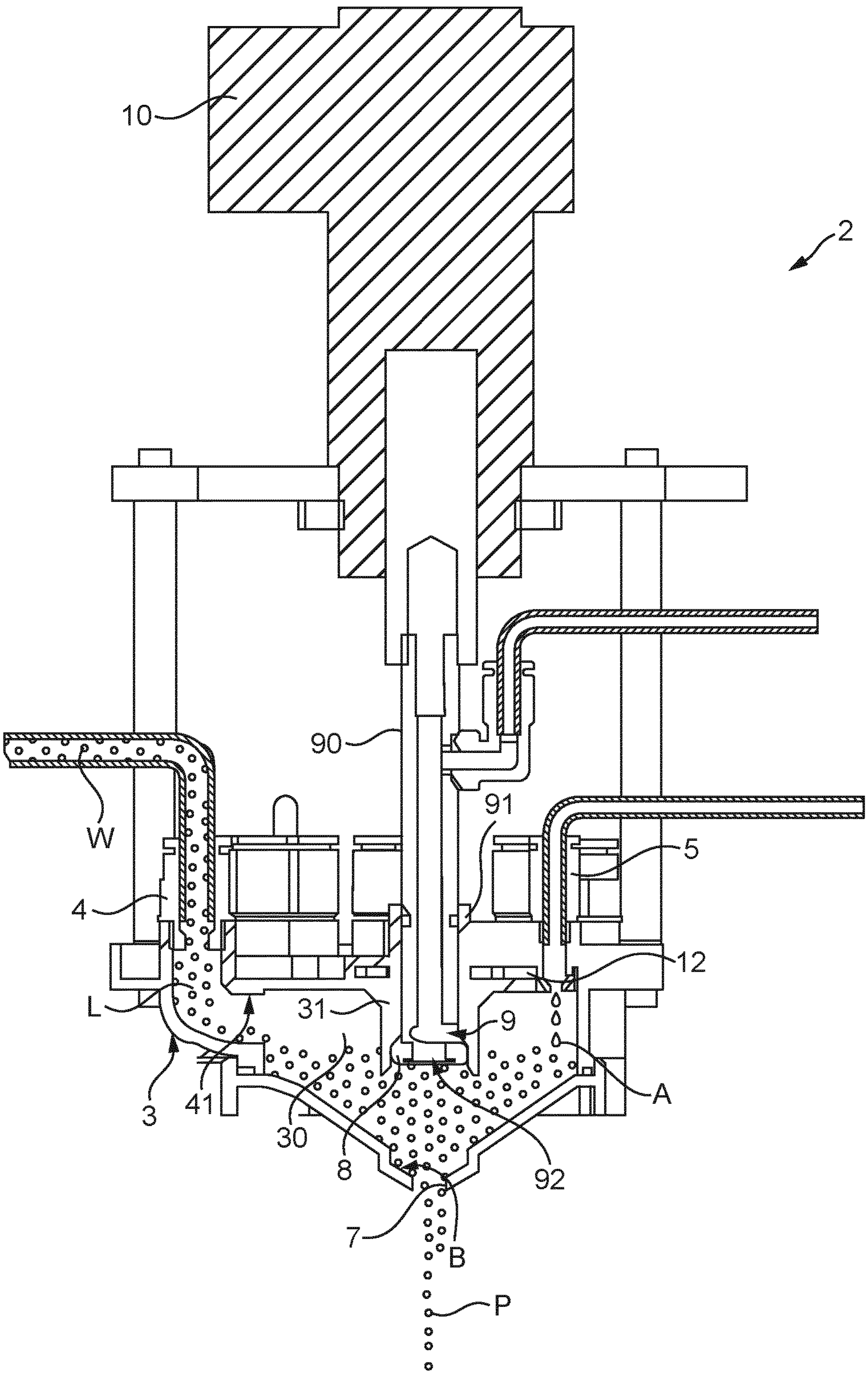
Figure 6A:
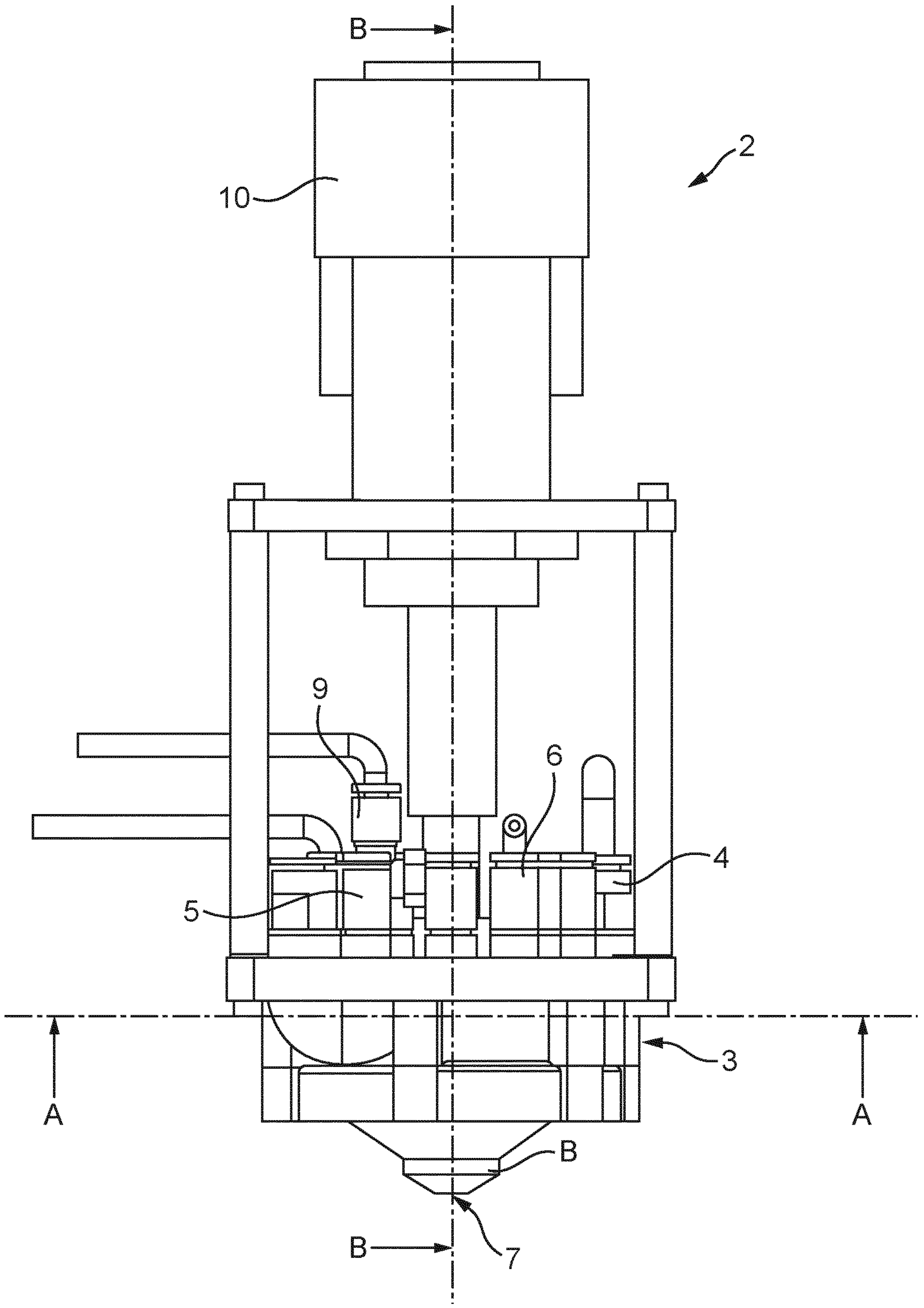
Figure 6B:
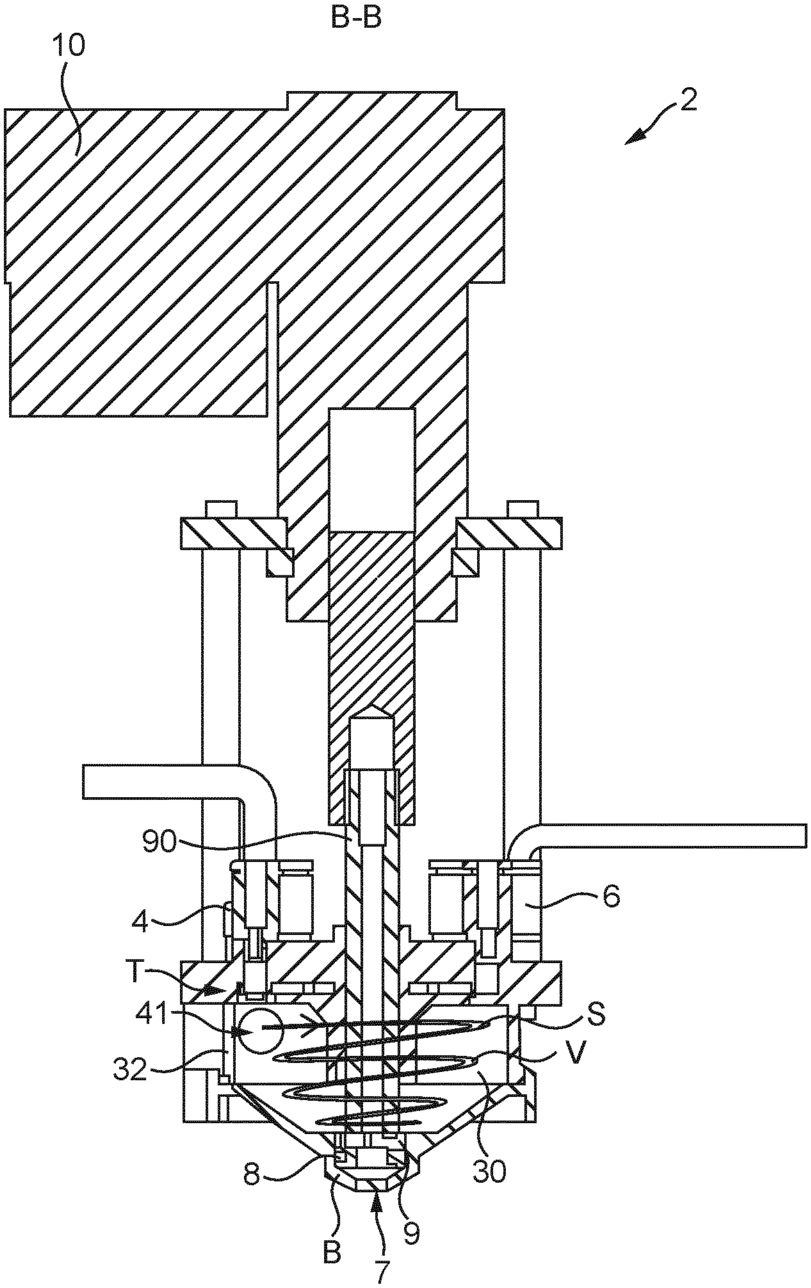
Figure 6C:
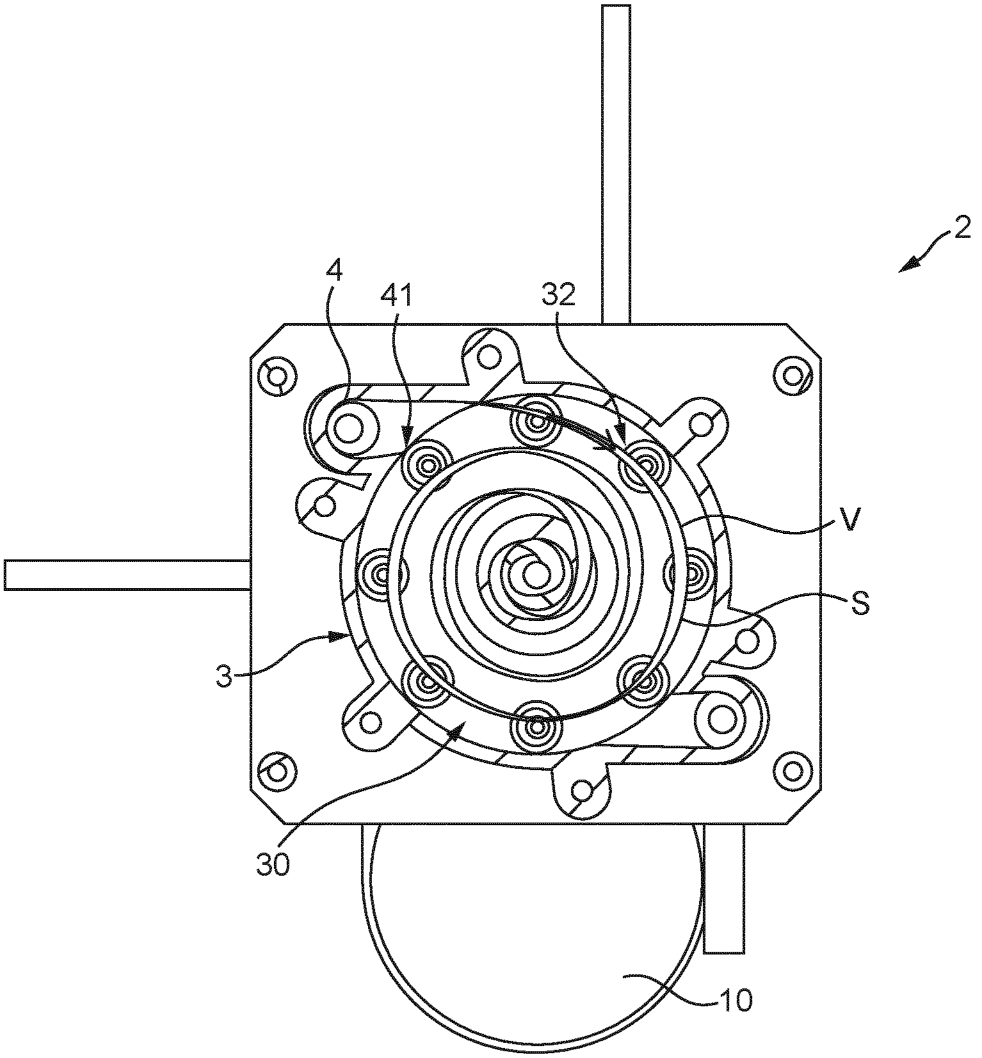

FIG. 1A shows a front view of a beverage preparation device according to a first embodiment of the present invention, FIG. 1B shows a cross-sectional side view of the beverage preparation device along line M-M of FIG. 1A, FIG. 2A shows a perspective view of the beverage mixing device according to an embodiment of the present invention, FIG. 2B shows a functional top view of the beverage mixing device according to FIG. 2A, FIG. 3 shows a cross-sectional side view of the beverage mixing device according to FIG. 2B along line G-G during a sanitization mode, FIG. 4 shows a cross-sectional side view of the beverage mixing device according to FIG. 2B along line H-H during an evacuation mode, FIG. 5 shows a cross-sectional side view of the beverage mixing device according to FIG. 2B along line G-G during a beverage preparation mode, FIG. 6A shows a side view of a beverage mixing device according to a further embodiment of the present invention, FIG. 6B shows a cross-sectional side view of the beverage mixing device according to FIG. 6A along line B-B during a sanitization mode, and FIG. 6C shows a cross-sectional bottom view of the beverage mixing device according to FIG. 6A along line A-A during a sanitization mode.

5. DETAILED DESCRIPTION

FIG. 1 shows a beverage preparation device 1 according to the present invention. The beverage preparation device 1 comprises a beverage mixing device 2 which itself forms an individual part of the present invention and will be described in more detail with reference to FIGS. 2 to 6 in the following.

The beverage mixing device 2 comprises a mixing body 3 defining a mixing chamber 30. The mixing chamber 30 is designed to allow for different beverage ingredients A to be mixed before being dispensed as a beverage product P, e.g., in an end-user's recipient, like a mug, bottle or the like.

The beverage mixing device 1 further comprises at least one or a plurality (here 10) fluid inlets 4, 5, 6 for supplying a fluid into the mixing chamber 30. As will be described in the following, the fluid inlets 4, 5, 6, may be provided for different process functions.

Moreover, the beverage mixing device 1 comprises a discharge opening 7 preferably at a bottom B of the mixing chamber 30 (at least in its functional orientation) to discharge a liquid (i.e. a beverage product P) from the mixing chamber 30 preferably by gravity.

A sealing element 8 is movably provided—here moveable in or along vertical direction—between a closed position for closing the discharge opening 7 (see FIGS. 3, 4 and 6B) and an open position (see FIG. 5) for releasing the discharge opening 7 to allow for a liquid in the mixing chamber 30 to be discharged via the discharge opening 7.

Moreover, the beverage mixing device 1 further comprises an evacuation outlet 9 for evacuating the mixing chamber 30 by a fluid be introduced into the mixing chamber 30 via the at least one or plurality of fluid inlets 4, 5, 6 when the discharge opening 7 is closed by the sealing element 8; i.e. the letter being in the closed position.

As can be clearly seen in FIG. 5, the sealing element 8 seals the evacuation outlet 9 from the mixing chamber 30 when being in the open position. This is here obtained by the sealing element 8 be positioned below the evacuation outlet 9 and by the evacuation outlet 9 be moved upwards along with the sealing element 8 into a channel section 31 laterally hiding the evacuation outlet 9, which in turn is closed towards the mixing chamber 30 by the sealing element 8 sitting in the channel section 31 between the evacuation outlet 9 and the mixing chamber 30. The sealing element 8 is thus preferably configured such that it closes the evacuation outlet 9 when being in the open position (see FIG. 5) and releases the evacuation outlet 9 when being in the closed position (see FIGS. 3, 4 and 6B).

The evacuation outlet 9 can be provided at a preferably vertically movable pipe or tube section 90 which is here preferably movably arranged within the channel section 31 provided in the mixing body 3. The pipe/tube section 90 preferably comprises a sealing element 91 (here an O-ring) being provided between an outer surface of the pipe/tube section 90 and an inner surface of the channel section 31 to allow for sealing the mixing chamber 30 and evacuation outlet 9 from an outside. To move the pipe/tube section 90 here vertically, there can be provided an actuator 10 like an electric motor. The actuator 10 can also be another type of actuator, like a pneumatic, hydraulic, mechanic and/or electric actuator.

As can be clearly seen in FIGS. 3 to 6, the movable pipe/tube section preferably carries the sealing element 8, which is thus easily moveable between the open and closed position along with the corresponding pipe/tube section 90.

As can be clearly seen in FIGS. 3 to 6, the evacuation outlet 9 is preferably positioned at a bottom B of the mixing chamber 30 (see FIGS. 3, 4 and 6B; i.e. at least in the functional or operational orientation) and preferably at a lower end 92 of the pipe/tube section 90. As can be seen in FIGS. 3, 4 and 6B, the evacuation outlet 9 is preferably positioned close to the discharge opening 7 for most effective evacuation of the mixing chamber 30. As being here positioned at the movable pipe/tube section 90, the evacuation outlet 9 is at least positioned here at a bottom of the mixing chamber 30 in the closed position of the sealing element 8, i.e. in case the pipe/tube section 90 is at its lowermost position. This allows for the evacuation outlet 9 be selectively positioned at a most preferred position in case the sealing element 9 is in its closed position and thus ready for a corresponding evacuation process as will be described in more detail herein below. For a beverage production process, the evacuation outlet 9 can then be selectively moved away from the discharge opening 7, e.g. upwards, and preferably be sealed off from the mixing chamber 30 by the sealing element 8, as can be seen in FIG. 5, to avoid any beverage product P be evacuated via the evacuation outlet 9 during a beverage preparation and dispensing process.

In a preferred embodiment, the sum of the cross-sectional area of the fluid inlet(s) 4, 5, 6 is preferably larger than the sum of the cross-sectional area of the evacuation outlet 9. This shall ensure a required increased pressure within the mixing chamber 30 at least during the sanitization process to ensure the mixing chamber 30 be completely filled with sanitizing liquid S during a sanitizing step thus increasing the sanitization effectiveness.

As exemplarily shown in FIG. 6, the inlet or the plurality of inlets 4, 5, 6, respectively, can open into the mixing chamber 30 via an inlet opening 41 being tangentially oriented to the mixing chamber 30—e.g. here to a side wall 32 thereof—so as to create a vortex V inside the mixing chamber 30 with a fluid L, W, A, S supplied via the respective inlet opening 41 into the mixing chamber 30. As can bee seen in FIG. 6B, the inlet opening 41 is preferably provided at a top T of the mixing chamber 30. In the shown preferred embodiment, the inlet opening 41 is preferably provided opposite to the discharge opening 7 to thus maximize the length of the vortex V which in turn results in a most effective swirling effect.

As can be seen in FIGS. 3 to 5, the beverage mixing device 1 may further comprise evacuation sections 11 provided at the fluid inlets 4, 5, 6 and/or the discharge opening 7 and/or the evacuation outlet 9 and designed to receive trapped gas or air to thus increase the sanitization effectiveness. The evacuation sections 11 are preferably fluidly connected to release outlets 12 which are preferably connected to one of the fluid inlets, e.g., for introducing gas/air into the mixing chamber 30, for evacuating the trapped gas/air to an outside of the mixing chamber 30.

Now referring to all FIGS. 1 to 6, the beverage preparation device 1 will be described in more detail. It has already been noted that the beverage preparation device 1 comprises a beverage mixing device 2 according to the present invention and as described herein above. The discharge opening 7 may be open downwards towards a dispensing area 70 onto which a consumer's recipient R (e.g. a cup, mug, bottle, etc.) can be placed for receiving the beverage product P be discharged/dispensed from the discharge outlet 7.

Moreover, the beverage preparation device 1 further comprises a liquid (preferably water) supply 20 fluidly connected to the at least one or the plurality of fluid inlets 4 for selectively delivering a liquid L, like water W, into the mixing chamber 30.

The liquid supply 20 can comprise a water supply for providing water W, e.g. to the mixing chamber 30. The liquid supply 20 may comprise a liquid storage 21 and/or a liquid connection 23 for connecting an external liquid/water source to provide the liquid L to be delivered to the mixing chamber 30. Moreover, the liquid supply 20 may further comprise a heater or a boiler 22 for heating the liquid/water to be delivered to the mixing chamber 30. The heater can be a static heater or an in-line heater. The liquid supply 20 may further comprise an (in-line) liquid or water filter 80 for filtering a liquid L (e.g. water W) to be delivered.

The beverage preparation device 1 further comprises at least one or a plurality of product supplies 40 each fluidly connected to the at least one or the plurality of fluid inlets 5 for selectively delivering a beverage ingredient A into the mixing chamber 30. The liquid supply 20 can be further fluidly connected to at least (a downstream) part of the product supply 40 or each of the product supplies 30 for selectively delivering the liquid L (e.g. water W) via the at least part of the respective product supply 40 into the mixing chamber 30. The supplied liquid L can thus be used for preparing a beverage product P (see FIG. 5) as well as used as a sanitizing liquid for sanitization purposes (see FIGS. 3, 6B and 6C).

The beverage preparation device 1 further comprises a gas supply 50 connected to the at least one or the plurality of fluid inlets 6 for selectively delivering a gas (e.g. air) G into the mixing chamber 30. The gas supply 50 can comprise an air supply for providing air, e.g., to the mixing chamber 30. The gas supply 50 may comprise an air pump or a compressor 51 for delivering (pressurized) gas G, preferably hot air, to the mixing chamber 30.

Moreover, the beverage preparation device 1 comprises a drainage 60 fluidly connected to the evacuation outlet 9 for draining the mixing chamber 30 here particularly during an evacuation process as will be described herein below.

In the following, a method for preparing a beverage product P according to the present invention will be described.

In a first step, a beverage preparation device 1 according to the present invention will be provided.

In a second step, the sealing element 8 is moved into the closed position (see FIG. 3). This is done here by moving down the pipe/tube section 90 carrying the corresponding sealing element 8 to thus close the discharge opening 7. When moving down the pipe/tube section 90, at the same time the evacuation outlet 9 is moved to a position at a bottom of the mixing chamber 30 and close to the discharge opening 7 and thus preferably at a lowermost section of the mixing chamber 30.

In a next step, the mixing chamber 30 is sanitized by circulating a sanitizing fluid S via the inlet or the plurality of inlets 4, 5, 6 through the mixing chamber 30 and via the evacuation outlet 9 to the drainage 60. This is exemplarily shown in FIGS. 3, 6B and 6C. As is shown here, the sanitizing fluid S is water W and preferably hot water being delivered both via the liquid supply 20 and thus corresponding inlet 4 and also via the corresponding part of the product supply/supplies 40 and thus corresponding inlets 5 to thus clean and sanitize the respective parts of the beverage preparation device 1 and beverage mixing device 2 being in contact with the corresponding beverage products P and beverage ingredients A to thus avoid any residues and hence cross-contamination particularly for a subsequent beverage preparation step.

In a next step, the mixing chamber 30 is evacuated by gas or air G being introduced via the inlet or plurality of inlets 4, 5, 6 through the mixing chamber 30 and via the evacuation outlet 9 to the drainage 60. This is exemplarily demonstrated in FIG. 4 showing the air be delivered by the corresponding inlets, 4, 5, 6 into the mixing chamber 30 and pushing the remaining liquid L within the mixing chamber 30 downwards towards the evacuation outlet 9 being positioned at the bottom B of the mixing chamber 30 and thus securely evacuating all of the liquid L within the mixing chamber 30 to an outside, e.g. the drainage 60.

After the evacuating step has been finished and the mixing chamber 30 preferably be dried out—e.g. by the use of hot air during the evacuation step—the sealing element 8 is moved into the open position for opening the discharge opening 7 and preferably also for closing (i.e. sealing off) the evacuation outlet 9 from the mixing chamber 30. This is done here by simply moving up the tube/pipe section 90 to an uppermost position by use of the actuator 10. Hence, the evacuation outlet 9 can preferably be sealed off from the mixing chamber 30 to thus avoid any beverage product P be discharged via the evacuation route. Moreover, the discharge opening 7 is released so that the beverage mixing device 2 is ready for beverage preparation and discharge. Therefore, liquid (like water) and/or other beverage ingredients A are delivered via the inlet or the plurality of inlets 4, 5, 6 into the mixing chamber 30 to prepare the beverage product P. This is exemplarily shown in FIG. 5.

The sanitizing fluid S can be hot water which can preferably be delivered by the liquid or water supply 20 and heated by the heater/boiler 22. The sanitizing fluid S can also be a chemically based sanitization liquid.

The gas for evacuation the mixing chamber 30 is preferably ambient air or can also be hot air being at a defined temperature above ambient and preferably below 65° C. to allow for an effective evacuation and preferably also drying of the mixing chamber 30.

As can be clearly seen in FIGS. 6B and 6C, the sanitizing fluid S can be supplied into the mixing chamber 30 via the inlet or the plurality of inlets 4, 5, 6, preferably the respective inlet opening(s) 41, so as to create a vortex V inside the mixing chamber 30. In a similar manner, also any other fluid or liquid can be supplied into the mixing chamber 30 via the inlet or the plurality of inlets 4, 5, 6, preferably their respective inlet opening(s) 41, so as to create a vortex V inside the mixing chamber 30. In case of the liquid be a liquid L like water W and/or a beverage ingredient A for preparing a beverage product, effective mixing of the components within the mixing chamber 30 can be obtained. Even the evacuation of the mixing chamber 30 can be made more effective by introducing a gas G in a similar way so as to create a vortex V inside the mixing chamber 30.

As can be clearly seen in FIG. 3, at least during the step of sanitizing the mixing chamber 30, any remaining gas in the mixing chamber 30 is preferably trapped in the evacuation sections 11 provided at (i.e. here around) the fluid inlets 4, 5, 6 and/or the discharge opening 7 and/or the evacuation outlet 9, respectively. The trapped gas is preferably evacuated via the release outlets 12 to an outside of the mixing chamber 30, preferably the drainage 60.

The present invention is not limited by the embodiments described herein above as long as being covered by the appended claims.

The invention claimed is:

1. Beverage mixing device comprising a mixing body defining a mixing chamber, at least one or a plurality of fluid inlets for supplying a fluid into the mixing chamber, a discharge opening to discharge a liquid from the mixing chamber, a sealing element being moveably provided between a closed position for closing the discharge opening and an open position for releasing the discharge opening to allow the liquid in the mixing chamber be discharged via the discharge opening, and an evacuation outlet for evacuating the mixing chamber by additional fluid introduced into the mixing chamber via the at least one or the plurality of fluid inlets when the discharge opening is closed by the sealing element.

2. Beverage mixing device according to claim 1, wherein, in the open position, the sealing element seals the evacuation outlet from the mixing chamber.

3. Beverage mixing device according to claim 2, wherein the sealing element is configured such that it closes the evacuation outlet-when being in the open position and releases the evacuation outlet when being in the closed position.

4. Beverage mixing device according to claim 1, wherein the evacuation outlet is provided at a vertically moveable pipe/tube section carrying the sealing element to be moveable between the open and closed position.

5. Beverage mixing device according to claim 1, wherein the discharge opening is positioned at a bottom of the mixing chamber to discharge the liquid from the mixing chamber.

6. Beverage mixing device according to claim 5, wherein discharge of the liquid from the mixing chamber is by gravity.

7. Beverage mixing device according to claim 1, wherein the evacuation outlet is positioned at a bottom of the mixing chamber.

8. Beverage mixing device according to claim 7, wherein the evacuation outlet positioned at the bottom of the mixing chamber is at a lower end of a pipe/tube section.

9. Beverage mixing device according to claim 1, wherein the at least one or plurality of fluid inlets, respectively, open into the mixing chamber via an inlet opening being tangentially oriented to the mixing chamber so as to create a vortex inside the mixing chamber with the fluid supplied via the at least one or plurality of fluid inlets through the respective inlet opening into the mixing chamber, wherein the inlet opening is provided at a top of the mixing chamber, and wherein the sum of the cross-sectional area of the at least one or plurality of fluid inlets is larger than the sum of the cross-sectional area of the evacuation outlet.

10. Beverage mixing device according to claim 9, wherein the inlet opening is also opposite the discharge opening.

11. Beverage mixing device according to claim 1, further comprising evacuation sections provided at the at least one or the plurality of fluid inlets and the discharge opening and the evacuation outlet and designed to receive trapped gas.

12. Beverage preparation device comprising a beverage mixing device comprising a mixing body defining a mixing chamber, at least one or a plurality of fluid inlets for supplying a fluid into the mixing chamber, a discharge opening to discharge a liquid from the mixing chamber, a sealing element being moveably provided between a closed position for closing the discharge opening and an open position for releasing the discharge opening to allow the liquid in the mixing chamber be discharged via the discharge opening, an evacuation outlet for evacuating the mixing chamber by additional fluid be introduced into the mixing chamber via the at least one or the plurality of fluid inlets when the discharge opening is closed by the sealing element, a liquid supply fluidly connected to the at least one or the plurality of fluid inlets for selectively delivering a source liquid into the mixing chamber, at least one or a plurality of product supplies each fluidly connected to the at least one or the plurality of fluid inlets for selectively delivering a beverage ingredient into the mixing chamber, a gas supply fluidly connected to the at least one or the plurality of fluid inlets for selectively delivering a gas into the mixing chamber, and a drainage fluidly connected to the evacuation outlet for draining the mixing chamber.

13. Beverage preparation device according to claim 12, wherein the liquid supply is further fluidly connected to at least part of the at least one or plurality of product supplies or each at least one or plurality of product supplies for selectively delivering the source liquid via the at least part of the respective at least one or plurality of product supplies into the mixing chamber.

14. Beverage preparation device according to claim 12, wherein the liquid supply comprises a water supply for providing water, wherein the liquid supply comprises a liquid storage and/or a liquid connection for connecting an external liquid source, and the liquid supply comprises a heater or a boiler for heating the source liquid, like water, to be delivered.

15. Beverage preparation device according to claim 12, wherein the gas supply comprises an air supply for providing air, and the gas supply comprises a pump or a compressor for delivering gas.

16. Beverage preparation device according to claim 15, wherein the gas is hot air.

17. Method for preparing a beverage product, comprising the steps of:

providing a beverage preparation device comprising:

a mixing body defining a mixing chamber, at least one or a plurality of fluid inlets for supplying a fluid into the mixing chamber, a discharge opening to discharge a liquid from the mixing chamber, a sealing element being moveably provided between a closed position for closing the discharge opening and an open position for releasing the discharge opening to allow the liquid in the mixing chamber be discharged via the discharge opening, an evacuation outlet for evacuating the mixing chamber by a fluid be introduced into the mixing chamber via the at least one or the plurality of fluid inlets when the discharge opening is closed by the sealing element, moving the sealing element into the closed position, sanitizing the mixing chamber by circulating a sanitizing fluid via the inlet or the plurality of inlets through the mixing chamber and via the evacuation outlet to the drainage, evacuating the mixing chamber by a gas being introduced via the at least one or plurality of fluid inlets through the mixing chamber and via the evacuation outlet to the drainage, moving the sealing element into the open position for opening the discharge opening, delivering a source liquid and/or beverage ingredients via the at least one or plurality of fluid inlets into the mixing chamber to prepare the beverage product, and dispensing the beverage product out of the discharge opening.

18. Method according to claim 17, wherein the sanitizing fluid is hot water.

19. Method according to claim 17, wherein the sanitizing fluid and/or the gas and/or the source liquid and/or the beverage ingredients are supplied into the mixing chamber via the at least one or plurality of fluid inlets, so as to create a vortex inside the mixing chamber.

20. Method according to claim 17, wherein, at least during the step of sanitizing the mixing chamber, any remaining gas in the mixing chamber is trapped in the evacuation sections provided at the at least one or plurality of fluid inlets and discharge opening and evacuation outlet.

21. Method according to claim 17, further comprising closing the evacuation outlet in connection with opening the discharge opening.

22. Method according to claim 17, wherein the sanitizing fluid and/or the gas and/or the source liquid and/or the beverage ingredients are supplied into the mixing chamber via one or more respective inlet opening of the at least one or plurality of fluid inlets.

* * * * *